United States Patent [19]

Okubo

[11] Patent Number: 5,948,036
[45] Date of Patent: Sep. 7, 1999

[54] ANTI-LOCK CONTROL METHOD AND APPARATUS

[75] Inventor: Satomi Okubo, Saitama, Japan

[73] Assignee: Akebono Brake Industry Co., Ltd., Tokyo, Japan

[21] Appl. No.: 08/790,057

[22] Filed: Jan. 28, 1997

[30] Foreign Application Priority Data

Jan. 29, 1996 [JP] Japan ..................................... 8-12608

[51] Int. Cl.$^6$ .............................. G06F 7/00; G06F 17/00
[52] U.S. Cl. ................................ 701/78; 701/66; 701/70; 701/71; 303/156; 303/166; 303/171; 303/173
[58] Field of Search .................................. 701/66, 70, 71, 701/75, 78; 303/166, 169, 170, 171, 173, 156, 159; 180/197, 247

[56] References Cited

U.S. PATENT DOCUMENTS

| | | | |
|---|---|---|---|
| 4,585,280 | 4/1986 | Leiber | 303/100 |
| 4,741,580 | 5/1988 | Matsubara et al. | 701/79 |
| 4,982,806 | 1/1991 | Yoshizawa et al. | 701/75 |
| 4,984,164 | 1/1991 | Maehara et al. | 364/426.02 |
| 4,991,910 | 2/1991 | Shimanuki et al. | 701/75 |
| 5,185,702 | 2/1993 | Okubo | 701/75 |
| 5,286,097 | 2/1994 | Myoi et al. | 701/74 |
| 5,511,867 | 4/1996 | Luckevich et al. | 303/191 |
| 5,647,647 | 7/1997 | Kato et al. | 303/122.09 |

FOREIGN PATENT DOCUMENTS 2-74455  3/1990  Japan .

*Primary Examiner*—William A. Cuchlinski, Jr.
*Assistant Examiner*—Gertrude Arthur
*Attorney, Agent, or Firm*—Morgan, Lewis & Bockius LLP

[57] ABSTRACT

An anti-lock control method whereby a control period of pressurization/pressure-reduction during anti-lock control is maintained constant. In the anti-lock control method, a control period T(n) from a high peak of a body velocity to a next high peak is measured, a difference between a target control period time (Tset) and the control period time T(n) is obtained when the control period time is shorter than the target control period time (Tset), the difference is added to a current pressurization start delay time Twait(n−1) to obtain a next pressurization start delay time Twait(n), and a next pressurization start time is delayed by the obtained pressurization start delay time.

12 Claims, 5 Drawing Sheets

ANTI-LOCK CONTROL METHOD AND APPARATUS

BACKGROUND OF THE INVENTION

1. Field of the Invention

The present invention relates to an anti-lock control method and apparatus. More particularly, the present invention relates to an anti-lock control method and apparatus by which a control period of pressurization/pressure-reduction during anti-lock control can be maintained constant.

2. Discussion of the Related Art

In a vehicle anti-lock control apparatus, a control unit is generally used to ensure security of the steering property and running stability and to shorten braking distance at the time of braking. The control unit includes a microcomputer which exerts control such that a control mode of braking hydraulic pressure is determined based on an electric signal representing a wheel velocity detected by a wheel velocity sensor, and such that a hold valve consisting of a normally opened electromagnetic valve and a decay valve consisting of a normally closed electromagnetic valve, are closed/opened to thereby increase, hold, or decrease the braking pressure.

An example of such an anti-lock control apparatus is disclosed in JP-A-2-74455 (which corresponds to U.S. Pat. No. 4,984,164). This anti-lock control apparatus seeks to provide a vehicle anti-lock control method in which optimum control can be conducted in accordance with a variety of conditions. In the JP-A-2-74455 patent document, status numbers are set in accordance with various conditions of the wheel velocity so that the wheel velocity conditions are clearly sectioned for (or assigned to) the respective statuses to thereby conduct the anti-lock control for each type of status.

The anti-lock control of the above JP-A-2-74455 patent document will now be described more specifically. In that patent document, a reference velocity Vr is set in advance such that the reference velocity decreases linearly with predetermined deceleration from a velocity (Vw−ΔV), which is lower than the wheel velocity Vw by a predetermined value ΔV, when the wheel velocity Vw decelerated by increasing the braking hydraulic pressure reaches a predetermined deceleration. Also, a first threshold velocity VT1, which follows a pseudo body velocity Vv with a predetermined velocity difference, and a second threshold velocity VT2, are set such that the condition Vv>VT1>VT2 is satisfied. The pressure reduction start point is set to the point of time which is the earlier one of (1) the point of time when the wheel velocity Vw becomes lower than the reference velocity Vr and (2) the point of time when the wheel velocity Vw becomes lower than the first threshold velocity VT1. The pressure reduction end point is set to the point of time which is the earlier one of (1) the point of time when the wheel velocity Vw reaches a low peak and (2) the point of time when the wheel velocity Vw again becomes higher than the second threshold velocity VT2 in the case where the wheel velocity Vw becomes lower than the second threshold velocity VT2 for at least one time.

In such control, since the pressure reduction can be started when the wheel velocity Vw becomes lower than the first threshold velocity VT1, it is possible to obtain a stable pressure reduction start point even in the case where the wheel velocity Vw becomes low gradually. If the wheel velocity Vw becomes low rapidly, on the other hand, since the pressure reduction is started at the point of time when the wheel velocity Vw becomes lower than the reference velocity Vr, the pressure reduction can be started immediately without any delay. Further, since the point of time when the wheel velocity Vw becomes lower than the second threshold velocity VT2 is included in the pressure reducing range, time sufficient for reducing the pressure after the friction coefficient of the road surface becomes low $\mu$ can be obtained even in the case where the friction coefficient is changed from high $\mu$ to low $\mu$ rapidly. In this way, wheel locking can therefore be effectively prevented.

However, in the case where increase/decrease of braking hydraulic pressure is performed by the above-mentioned anti-lock control apparatus, when a slipping wheel is accelerated to the neighborhood of a body velocity, pressurization is started from that point of time in accordance with a predetermined value. This can result in the case where the control period becomes short, as shown by the dotted line in FIG. 6, because of the change of braking efficiency or the like (i.e., the braking efficiency becomes good). In the case where this phenomenon occurs such that the control period becomes short, body vibrations are caused thereby and this state is continued or maintained. Particularly in a vibration system incorporating an engine and a driven wheel coupled with one another through a driving shaft, as shown in FIG. 7, the change of the braking torque in this state causes torsional vibrations in the direction of rotation of the driving wheel. If these vibrations coincide with the natural frequency of the vibration system, there is a problem in that a resonance phenomenon is generated whereby the vibrations do not stop.

SUMMARY OF THE INVENTION

Accordingly, the present invention is directed to an anti-lock control method and apparatus that substantially obviate one or more of the problems due to limitations and disadvantages of the related art.

An object of the present invention to provide an anti-lock control method and an apparatus therefor, in which the period of pressurization/pressure-reduction during the above-mentioned control is continuously monitored, so that when the current period of pressurization/pressure-reduction is shorter than a target control period, the next pressurization start point of time is delayed by a predetermined time, or loose pressurization is applied, to adjust or prolong the control period to thereby suppress body vibrations. According to the present invention, the control period can be adjusted by delaying the pressurization start point of time or by carrying out loose pressurization, so that body vibrations can be reliably prevented from being generated during anti-lock control.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the anti-lock control method for executing anti-lock control comprises the steps of: measuring a control period time from a first peak of a body velocity to a second peak of the body velocity; determining a difference between a target control period time and the measured control period time; adding the difference to a current pressurization start delay time to obtain a next pressurization start delay time; and delaying a next pressurization start time by the obtained pressurization start delay time to thereby execute anti-lock control.

In another aspect of the present invention, an anti-lock control method is provided for executing anti-lock control on the basis of braking information such as a wheel velocity, a pseudo body velocity, etc. The method comprises the steps of measuring a control period time T(n) from a high peak of a body velocity to a next high peak, obtaining a difference between a target control period time (Tset) and the measured control period time T(n) when the control period time is shorter than the target control period time (Tset), adding the difference to a current pressurization start delay time Twait (n−1) to obtain a next pressurization start delay time Twait (n), and delaying a next pressurization start time by the obtained pressurization start delay time to thereby execute anti-lock control.

In a further aspect of the present invention, an anti-lock control apparatus comprises wheel velocity sensors, a pseudo body velocity arithmetic circuit for determining a pseudo body velocity based on electrical signals from the wheel velocity sensors, and control logic circuitry for performing anti-lock control on the basis of signals from the wheel velocity sensors and a signal from the pseudo body velocity arithmetic circuit, wherein the control logic circuitry is designed to measure a control period time T(n) from a high peak of a body velocity to a next high peak, obtain a difference between a target control period time (Tset) and the measured control period time T(n) when the control period time is shorter than the target control period time (Tset), add the difference to a current pressurization start delay time Twait(n−1) to obtain a next pressurization start delay time Twait(n), and delay a next pressurization start time by the obtained pressurization start delay time.

It is to be understood both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention. In the drawings.

DETAILED DESCRIPTION OF PREFERRED EMBODIMENTS

Reference will now be made in detail to the preferred embodiments of the present invention, examples of which are illustrated in the accompanying drawings.

Figure 1:
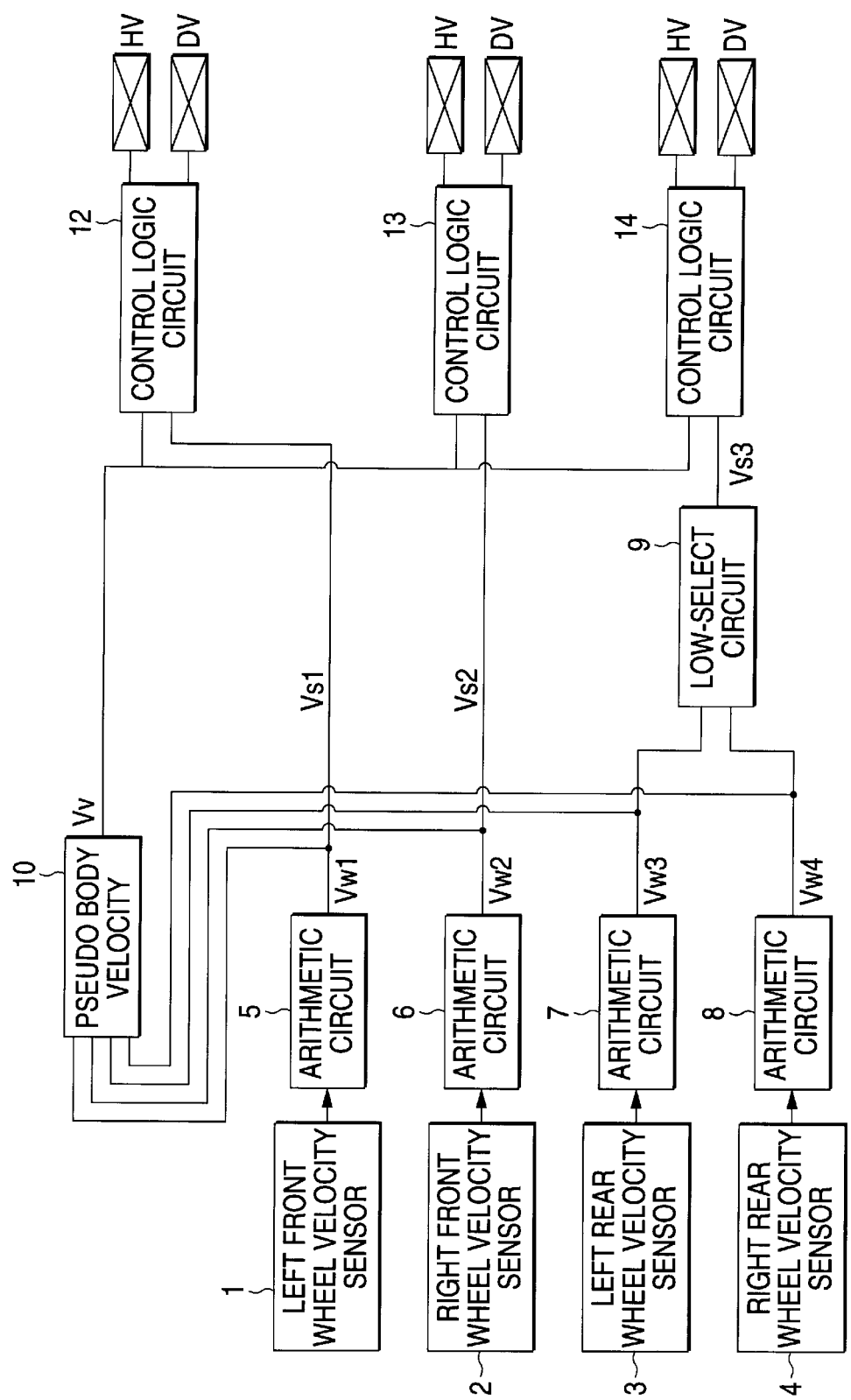
FIG. 1 is a diagram of a structure of an anti-lock control apparatus relating to an embodiment of the present invention.

FIG. 1 is a block diagram illustrating a three-channel anti-lock control system in accordance with the present invention. In FIG. 1, reference numeral 1 represents a left front wheel velocity sensor; 2, a right front wheel velocity sensor; 3, a left rear wheel velocity sensor; and 4, a right rear wheel velocity sensor. Outputs of the wheel velocity sensors 1 to 4, which are frequency signals, are sent to arithmetic circuits 5 to 8 respectively, and operated therein to thereby obtain signals representing wheel velocities Vw1 to Vw4, respectively. The signals representing the left front wheel velocity Vw1 and the right front wheel velocity Vw2 are selected as first and second system velocities Vs1 and Vs2, respectively.

The signals representing the left rear wheel velocity Vw3 and the right rear wheel velocity Vw4 are sent to low select circuit 9 so that a lower one of the two wheel velocities Vw3 and Vw4 is selected as a third system velocity Vs3. Further, the signals representing the respective wheel velocities Vw1 to vw4 are sent to a pseudo body velocity arithmetic circuit 10. In the pseudo body velocity arithmetic circuit 10, the highest one of the four wheel velocities Vw1 to Vw4 is selected (high-select), and a velocity limiting the follow-up limit of this highest wheel velocity to ±1G is calculated out as a pseudo body velocity Vv.

The system velocities Vs1, Vs2, and Vs3 are supplied to control logic circuits 12, 13, and 14, respectively. The pseudo body velocity Vv obtained by the pseudo body velocity arithmetic circuit 10 is also supplied to each of the control logic circuits 12, 13, and 14. The control logic circuits 12 to 14 conduct ON-OFF control of conventionally well-known hold valves and decay valves in respective systems on the basis of these signals Vs1, Vs2, Vs3, and Vv, and conduct control-period control, described in greater detail below, at the same time.

Figure 2:
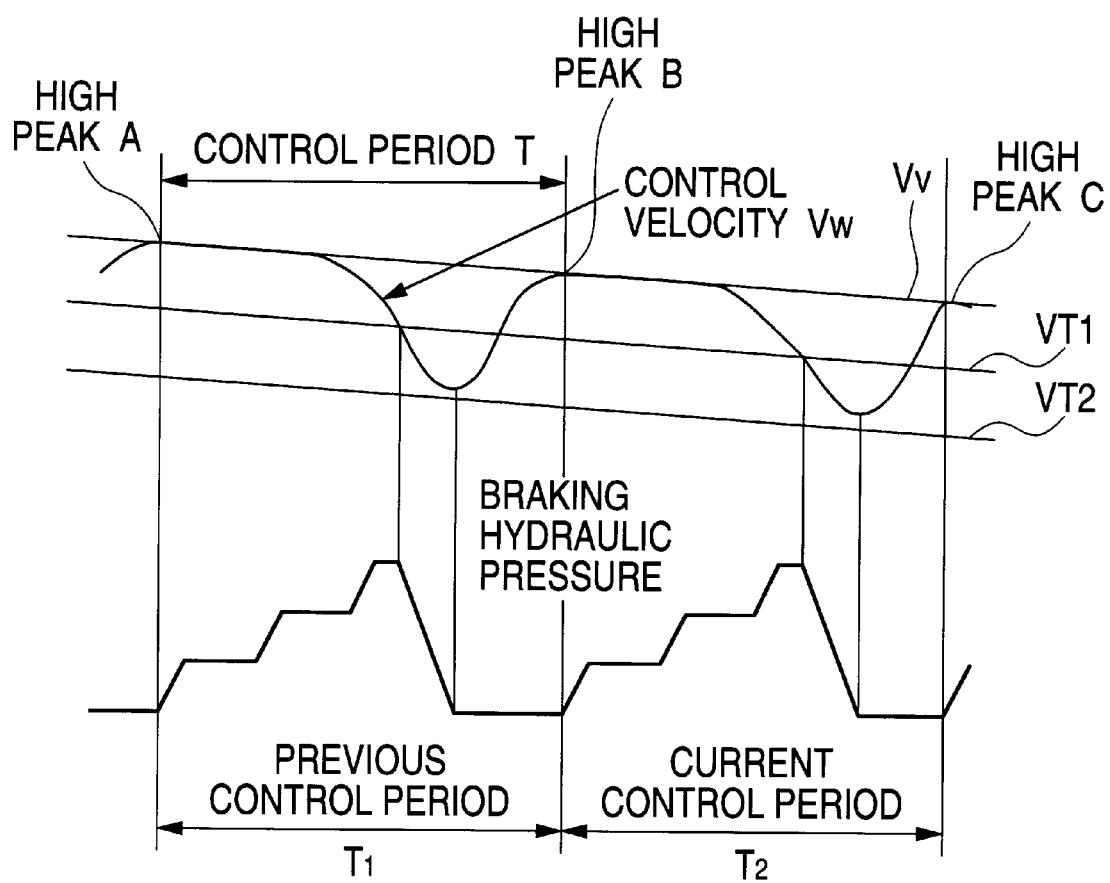
FIG. 2 is an explanatory diagram of a control period.

The control method of the control period will now be described with reference to FIG. 2. In FIG. 2, Vw designates a control velocity (wheel velocity); Vv, a pseudo body velocity; VT1, a first threshold value; and VT2, a second threshold value. The time of the interval from a high peak of the control velocity (for example, point A in the drawing) to the next high peak (point B) is defined as a control period T. In other words, in FIG. 2, the control period T is defined to be a period from a first high peak to a second high peak. That is, in the control period T, when increase of the braking hydraulic pressure is started at a high peak of the control velocity Vw, the control velocity Vw decreases. When the control velocity Vw becomes lower than the first threshold value VT1, reduction of the braking hydraulic pressure is started. The braking hydraulic pressure is then maintained during the time when the control velocity Vw reaches a low peak. Thereafter, when the control velocity Vw increases successively to reach the next high peak, increase of the braking hydraulic pressure is started. The control mode from the point of time when the control velocity Vw reaches a high peak where the control velocity Vw starts to decrease to the point of time when the control velocity Vw becomes lower than the first threshold value VT1, is a pressurization mode.

Under such control, a current control period time Tn is measured, and when this measured control period time is shorter than a target control period time (Tset) preset in a program (e.g., a computer program), the next pressurization start delay time Twait(n) is obtained. In this way, the next control period time becomes the target control period time, and this thereby prevents the next control period time from becoming unacceptably short.

The pressurization start delay time Twait(n) is calculated in accordance with the following expression stored in advance in the control program.

$$\text{Twait}(n)=\text{Twait}(n-1)+[\text{Tset}-T(n)]$$

where: Twait(n) designates a next pressurization start delay time;

Twait(n−1) designates the current pressurization start delay time;

Tset designates a predetermined time; and

T(n) designates the current control period time.

Figure 3:
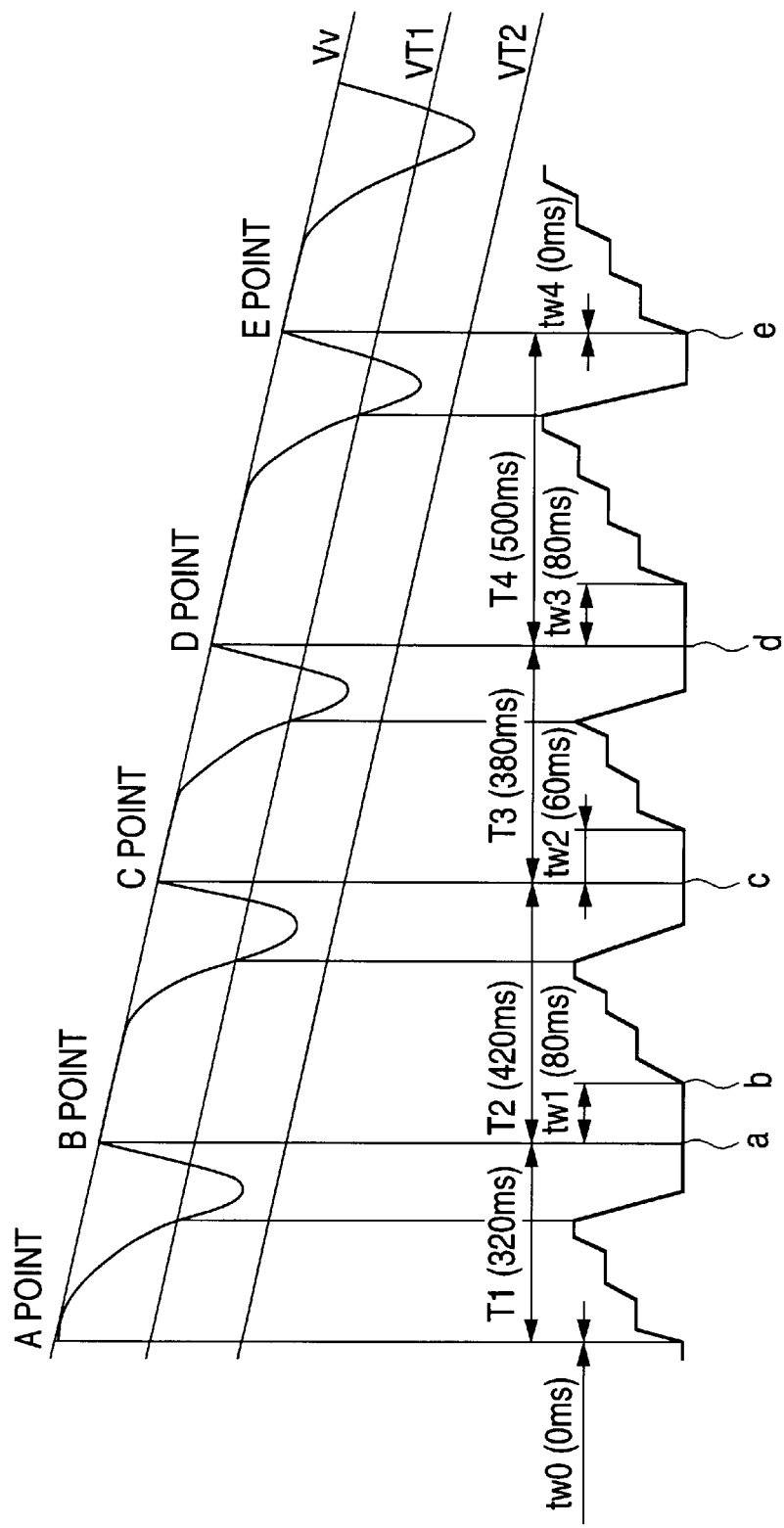
FIG. 3 is an explanatory diagram of a control period where specific figures are written.

Next, the control mode for delaying the pressurization start time will be described specifically with reference to an example shown in FIG. 3. In FIG. 3, the current control period T1 is 320 ms from a point where the control enters the pressurizing mode (for example, point A) to a point where the control enters the pressurizing mode (for example, point B), and the current pressurization start delay time tw0 is 0 ms. In addition, the value of the preset target control period is set to be 400 ms, for example, in this control mode.

Substituting these figures into the above-mentioned expression to obtain the next pressurization start delay time tw1:

$$tw1=0+[400-320]=80 \text{ ms}$$

Figure 5:
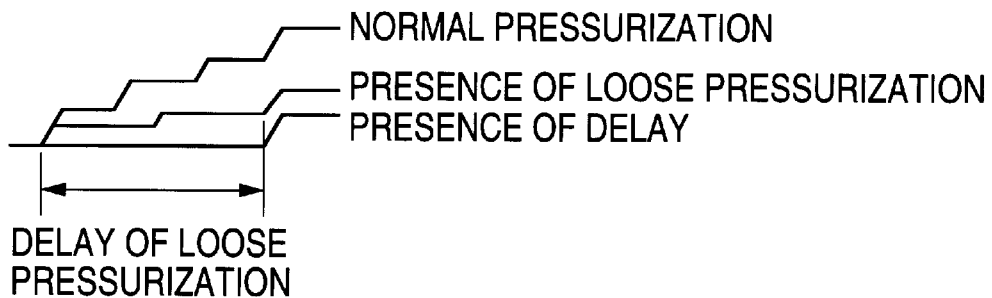
FIG. 5 is an example of a state of hydraulic pressure for delaying pressurization.
Figure 6:
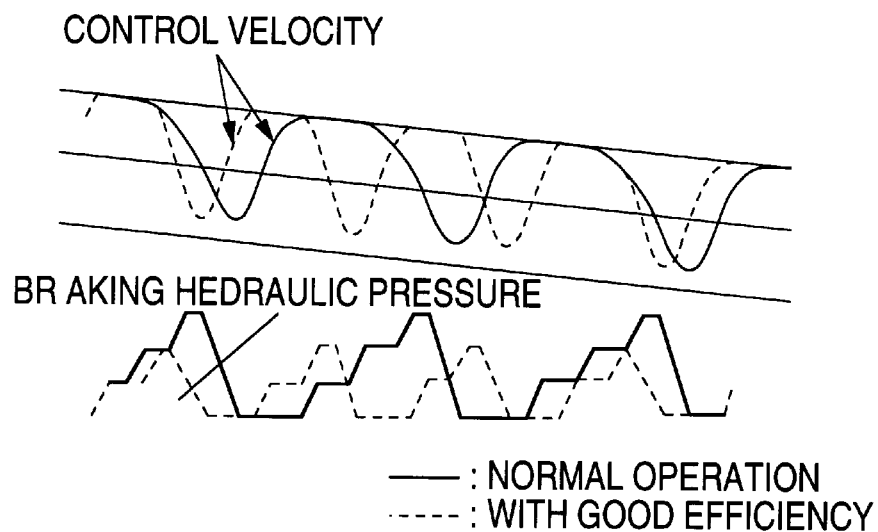
FIG. 6 is an explanatory diagram of a conventional control period, wherein the dotted line shows the state in which the control period is shortened.
Figure 7:
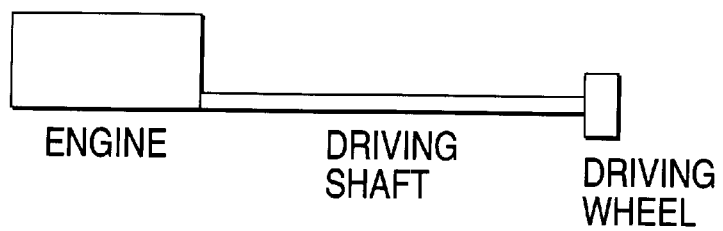
FIG. 7 is an explanatory diagram of a driving system.

That is, in this case, the next pressurization is delayed so that the pressurization start point of time is delayed by 80 ms from the point where the control becomes a pressurizing mode (the point a). The delay of the pressurization is performed by prolonging the period of time to maintain the pressurization or, alternatively, by applying loose pressurization as shown in FIG. 5.

Next, the period of time from a point of time when the second control period time begins (for example, point C) to a point of time when the control procedure enters the next pressurization mode from the second control period time (for example, point B) measures 420 ms.

Therefore, the next pressurization delay time is:

$$tw2=80+[400-420]=60 \text{ ms}$$

In the same manner, in the case shown in the drawing:

$$tw3=60+[400-380]=80 \text{ ms}$$

$$tw4=80+[400-500]=-20 \text{ ms}$$

Herein, such a negative delay time is set to 0 ms.

As has been described, in accordance with this control procedure, the current control period time is measured, and when this control period time is shorter than the target control period time (Tset) defined in advance in a program, the difference between the target control period time (Tset) and the current control period time T(n) is obtained. This difference is added to the current pressurization start delay time Twait(n−1) to obtain the next pressurization start delay time Twait(n). The pressurization start time is delayed by applying loose pressurization or by maintaining the braking hydraulic pressure for this delay time. In this way, the control period time is prolonged so as to be made equal to the target control period time. This thereby suppresses unwanted vibrations.

Figure 4:
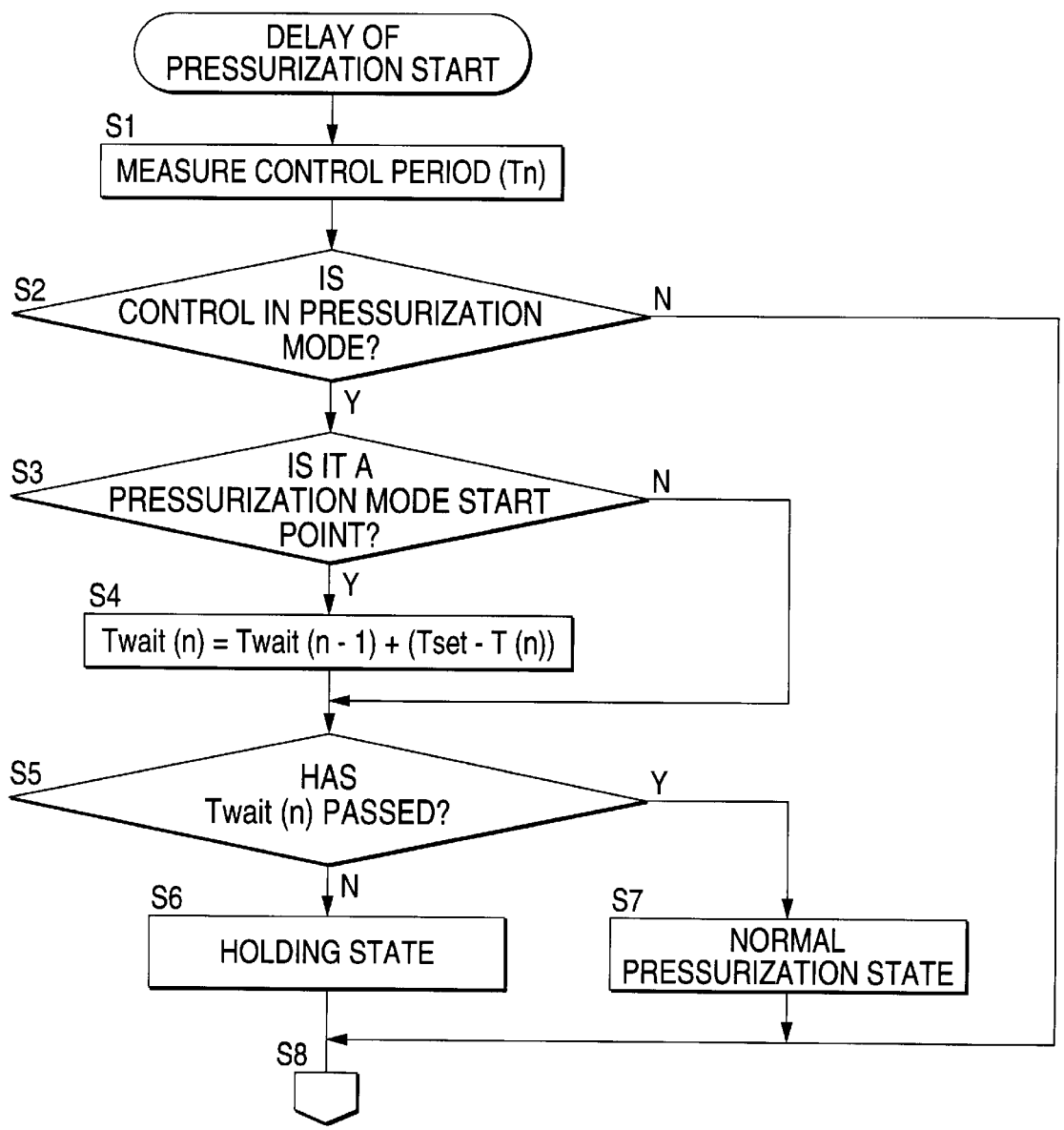
FIG. 4 is a flow chart illustrating a method for performing a control period.

A flow chart illustrating control of the above-mentioned control period will now be described with reference to FIG. 4. With reference to FIG. 4, when a program for delaying a pressurization start point (or for applying loose pressurization) is implemented, first, a control period T(n) from a high peak (for example, point A in FIG. 3) to the next peak (for example, point B in FIG. 3) is measured in a step S1. A timer or the like may be used, for example, as the means for measuring the period of time from the point A to the point B.

Next, the control procedure enters a step S2 where judgment is made as to whether or not the present control is in a pressurization mode. In the case of existence of the pressurization mode, the control enters a step S3 where judgment is made as to whether or not the control is at a start point of the pressurization mode. Herein, each of the points a, b, . . . corresponding to high peaks in FIG. 3 will be considered as the start point of the pressurization mode.

When it is concluded in the step S3 that control is at a start point of the pressurization mode, the control enters a step S4 where the delay time of the next pressurization start point is obtained by using the above-mentioned expression in the manner as follows:

$$\text{Twait}(n)=\text{Twait}(n-1)+[\text{Tset}-T(n)]$$

For example, according to FIG. 3, the current control period T1 is 320 ms, and the current pressurization start delay time tw0 is 0 ms. Therefore, the next pressurization start delay time is:

$$twait(1)=0+[400-320]=80 \text{ ms}$$

In a step S5, judgment is made as to whether or not the pressurization delay time Twait(n) obtained in the step S4 has passed. If the pressurization delay time has passed, the control enters a step S7 in which normal pressurization is started (at the point e in FIG. 3), and then the control enters a step S8 wherein the program is repeated. If the pressurization delay time has not passed yet in step S5, the control enters a step S6 in which the holding state is maintained, and then the control enters the step S8 where the program is repeated again.

When it is concluded in step S2 that the control is not in the pressurization mode, the control enters step S8 where the program is repeated again.

When it is concluded in the step S3 that control is not at a start point of the pressurization mode, then the control of step S5 and the steps which follow it are executed.

As has been described, in this control configuration, since a pressurization start point is delayed, or loose pressurization is applied, to bring the control period near the target control period time, it is possible to avoid resonance within the driving system due to the shortening of the control period.

Also, according to the present invention, the period of pressurization/pressure-reduction during control is always monitored, and when a current period of pressurization/pressure-reduction is shorter than a target control period, the next pressurization start time is delayed by a predetermined time, or loose pressurization is applied, so as to perform an adjustment to prolong the control period. In this way, it is possible to prevent unwanted body vibrations. In addition, a superior effect is provided in that it is possible to prevent resonance from occurring within the driving system.

It will be apparent to those skilled in the art that various modifications and variations can be made in the anti-lock control method and apparatus of the present invention without departing from the spirit or scope of the invention.

Thus, it is intended that the present invention cover the modifications and variations of this invention provided they come within the scope of the appealed claims and their equivalents.

What is claimed is:

1. An anti-lock control method for pressurizing a brake pressure based on a comparison of a vehicle wheel speed with a pseudo vehicle body velocity calculated in accordance with speeds of a plurality of vehicle wheels, the method comprising steps of:

measuring a control period time from a high peak of the vehicle wheel speed to a next high peak of the vehicle wheel speed;

comparing the control period time with a target control period time;

pressurizing the brake pressure at a pressurization start time determined by the comparison of the vehicle wheel speed with the pseudo vehicle body speed when the control period time is longer than the target control period time; and delaying the pressurization start time by a pressurization start delay time determined in accordance with a difference between the control period time and the target control period time when the control period time is shorter than the target control period time.

2. The method according to claim 1, wherein the anti-lock control method uses at least one of the vehicle wheel speed information and the pseudo vehicle body velocity.

3. The method according to claim 1, wherein the vehicle wheel speed corresponds to a wheel velocity of a vehicle having wheels.

4. The apparatus of claim 2, wherein the apparatus is incorporated within a vehicle having wheels, and wherein the vehicle wheel speed corresponds to a wheel velocity of the vehicle.

5. The method according to claim 1, wherein the method is performed in a vehicle having wheels, and wherein the vehicle wheel speed corresponds to a wheel velocity of the vehicle.

6. The method according to claim 1, wherein the step of determining the difference between the target control period time and the control period time is performed when the control period time is shorter than the target control period time.

7. The method according to claim 1, wherein the delaying step is performed to prolong a subsequent control period time.

8. The method according to claim 1, wherein, when the comparing step determines that the control period time is longer than the target control period time, a zero difference value is added to the current pressurization start delay time to obtain a next pressurization start delay time.

9. The method according to claim 1, wherein the target control period time is a constant preset value.

10. The method according to claim 1, wherein the measuring, determining, adding, and delaying steps are performed repeatedly to thereby execute anti-lock control.

11. The method according to claim 1, further comprising the steps of:

measuring a control period time from the second peak of the body velocity to a third peak of the body velocity;

determining a difference between the target control period time and the control period time between the second and third peaks;

adding the difference determined in the previous step to a current pressurization start delay time to obtain a next pressurization start delay time; and delaying a next pressurization start time by the pressurization start delay time obtained in the previous step to thereby execute further anti-lock control.

12. An anti-lock control apparatus comprising:

a plurality of wheel speed sensors;

a pseudo vehicle body speed arithmetic circuit for determining a pseudo vehicle body speed based on electrical signals from at least one of the plurality of wheel speed sensors; and a control logic circuit for performing anti-lock control based on signals from the plurality of wheel speed sensors and the pseudo vehicle body speed arithmetic circuit, wherein the control logic circuit measures a control period time from a high peak of the vehicle wheel speed to a next high peak thereof, compares the measured control period time with a target control period time, pressures the brake pressure at a pressurization start time determined by the comparison of the vehicle wheel speed with the pseudo vehicle body speed when the measured control period time is longer than the target control period time, and delays the pressurization start time by a pressurization start delay time determined in accordance with a difference between the control period time and the target control period time when the measured control period time is shorter than the target control period time.

* * * * *